United States Patent [19]

Zajic et al.

[11] 4,211,645

[45] Jul. 8, 1980

[54] FOAM FLOTATION ACTIVATED SLUDGE PROCESS

[75] Inventors: James E. Zajic; Martha A. Hill, both of London; Donald F. Manchester, Oakville; Karel Muzika, Ottawa, all of Canada

[73] Assignee: Abitibi Paper Company Ltd., Toronto, Canada

[21] Appl. No.: 790,852

[22] Filed: Apr. 25, 1977

[30] Foreign Application Priority Data

Jul. 16, 1976 [CA] Canada .................................. 257177

[51] Int. Cl.$^2$ .......................... C02C 1/06; C02C 5/10
[52] U.S. Cl. ......................................... 210/7; 210/11; 210/13; 435/251; 435/911
[58] Field of Search ..................... 210/7, 11, 13, 2, 14, 210/18; 435/251, 267, 911, 924

[56] References Cited

U.S. PATENT DOCUMENTS

| | | | |
|---|---|---|---|
| 2,897,148 | 7/1959 | Laboureur et al. | 435/251 X |
| 3,711,392 | 1/1973 | Metzger | 210/11 X |
| 4,085,041 | 4/1978 | Fullerton et al. | 210/13 |

OTHER PUBLICATIONS

Ng et al., "Effect of SO$_2$ Removal on the Biodegradability of Arbiso Spent Sulphite Liquor," *Water Pollution Research in Canada* (1972).

*Primary Examiner*—Thomas G. Wyse
*Attorney, Agent, or Firm*—Stevens, Davis, Miller & Mosher

[57] ABSTRACT

The specification discloses making a mixed fungal (yeast and yeast-like) system culture adapted to biodegradation of spent sulfite liquor (SSL) comprising the steps of exposing a mixed culture system (being a sludge from a sewage treatment plant) to increasing concentration of SSL until the fungus becomes acclimatized to SSL of the desired concentration. The resulting biotic population comprises a fungal mixture, of yeast and yeast-like cultures. It was based on an autolytic culture system: *Phialophora jeanselmei, Phialophora richardsiae, Hyalodendron liqnicola, Trichosporon infestans* and *Candida tropicalis*. A method and apparatus are disclosed for biodegrading both the soluble substrates in a spent sulfite liquor and the biological solids produced therefrom by a potentially autolytic culture system. The method comprises the steps of adding a nutrient medium, adjusting the pH to mildly acid or neutral condition, feeding the mixture to a fungal culture inoculated fermentor with agitation and with aeration, resulting in foaming of the mixture, said foam carrying with it the fungi and sludge resulting from the fermentation, the suspended solids content of the foam when collapsed being generally not more than half the suspended solids content of the fermentor broth, said foam being processed so as to separate the components into a sludge and a clarified effluent, said sludge being recycled to the fermentor vessel and the clarified effluent prepared for discharge or additional processing. Under optimum operating conditions as much as 85 to 90% BOD removal from spent sulfite liquor is accomplished.

44 Claims, 1 Drawing Figure

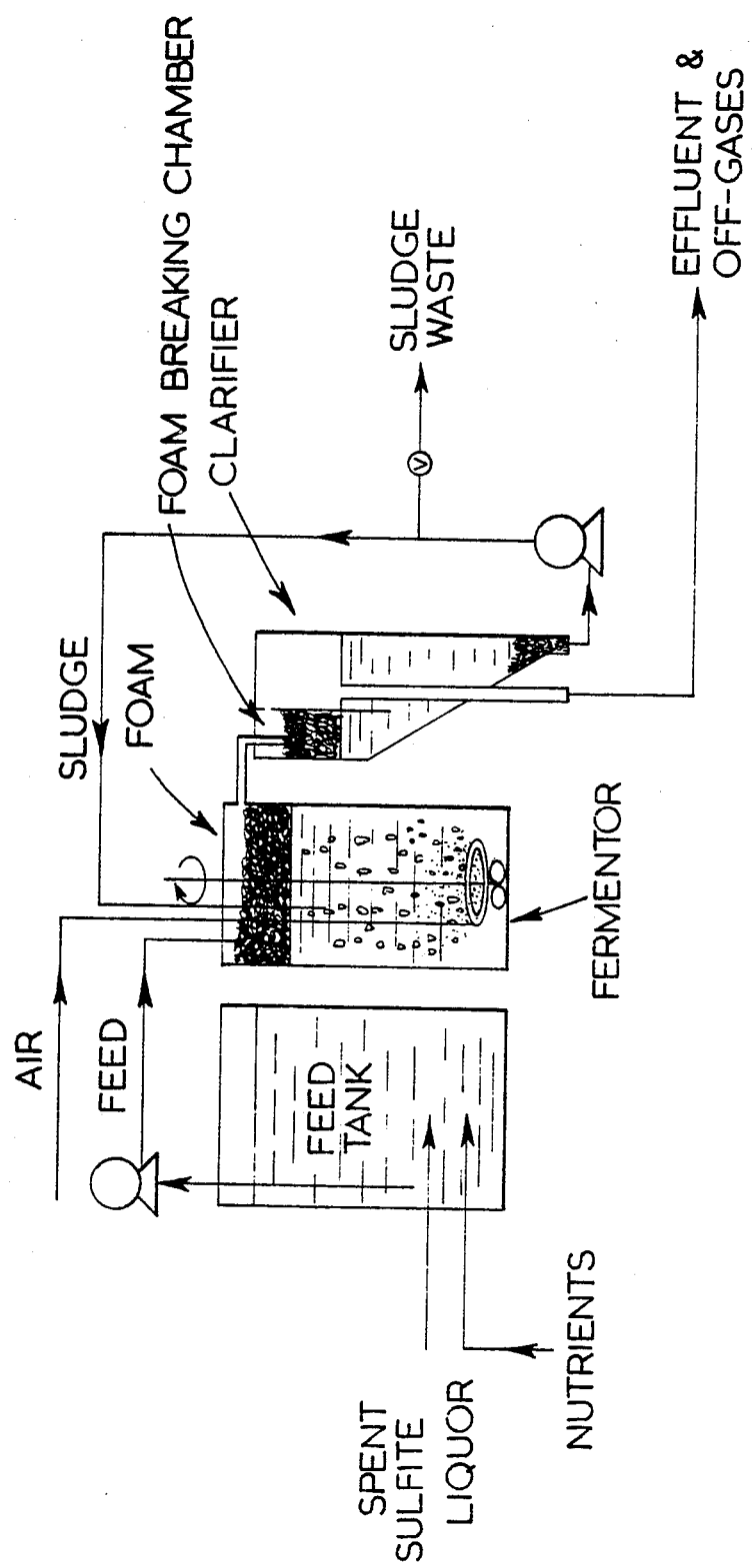

FOAM FLOTATION ACTIVATED SLUDGE PROCESS

This invention relates to an improvement in the treatment of waste liquor for reduction of the biochemical oxygen demand (BOD) thereof. It is of particular interest in the treatment of difficult effluents such as the spent sulfite liquor resulting from production of pulp by the neutral sulfite process, the bisulfite process or the acid sulfite process, or in any process producing an effluent sufficiently high in biologically degradable dissolved solids that it involves a disposal problem.

Biological treatment is applied to pulp mill waste effluents, but these systems operate on low concentrations of spent liquor because of the toxicity of such liquors, and are generally designed to operate at low concentrations of suspended solids (biomass). In addition the sludge produced settles very slowly and creates problems, usually preventing successful continuous operation. Such systems are generally not very efficient when compared with high rate activated sludge processes operating at a high level of suspended solids (SS). Owing to the complexity of suflite liquor (SSL) from the sulfite process, it has been assumed hitherto that SSL could not support the strong microbial growth which is essential to a high rate process for reduction of BOD and for a high degress of autolysis.

In accordance with a program of research carried out at the University of Western Ontario in London, Ontario, Canada, we have developed a microbial culture specially adapted for this purpose and have evaluated its performance. A mixed microbial population originally obtained from domestic sewage survived in and became acclimatized to neutral sulfite semi chemical (NSSC) liquor from the Abitibi Paper Company Ltd. plant at Sturgeon Falls, Ontario during more than a year of continuous feeding. Growth was enhanced by the addition of small amounts of nutrients (ammonia and phosphates), by pH control (adding lime or sodium hydroxide,) and by aeration. The culture then was adapted to and has been maintained in undiluted SSL from the digesters of the Iroquois Falls plant, and has provided the inoculum for all the fermentation studies on which the present specification is based. This yeast culture composition appears to have been very stable throughout the relevant period. It has a high degree of resistance to sulfur dioxide and grows well at an acid pH.

The presence of sulfur dioxide appears to be of some importance in maintaining the stability of the culture. Sulfur dioxide is a strong reducing agent and it kills almost all microbes except yeast and fungi of the present type. The air sparging will oxidize $SO_2$ to $SO_3$ thus lessening the toxicity while increasing the acidity and thereby discouraging the growth of extraneous populations.

The present invention differs from known activated sludge processes, in that the biomass and suspended solids in the activated sludge fermentor unit are conveyed as foam-solids directly to a unit where the foam is collapsed and the active bio-sludge recovered for recycle to the activated sludge unit. The foam transfer system is used to reduce the SS levels to a point that settling can be accomplished. This method of transfer also contributes to solids control of the reactor and to autolysis.

Foams are produced in the aeration of many wastes, and especially pulp and paper waste. In conventional practice this must be controlled because it is a deterrent to the mass transfer of oxygen, especially if mechanical surface aerators are used. Foam can become a serious nuisance since it may be several feet deep and can literally cover everything, preventing good maintenance and process control. Antifoams and all types of mechanical devices are used to control and collapse such foams. Such antifoams usually decrease the mass transfer of oxygen in the process. In the present invention foaming is an important part of the process as only bio-sludge entrapped in the foam is collected and transferred to a chamber in the clarifier. Sluge is recovered by collapsing the foam and it is observed to rapidly settle to the bottom of the clarifier and may be recycled in whole or part along with a minimum of liquor back to the activated sludge unit.

In a conventional process biosludge is transferred to a clarifier as a liquid, and no attempt is made to recover foam or the solids present in foam for passage to the clarifier. Wastes which foam can often not be treated by the activated sludge process because of the foaming propensity. This new process, which requires foaming as part of the process, has distinct advantages as it accomplishes the same objectives as a conventional activated sludge process.

The aeration unit will normally be totally enclosed to aid in collection of foam. Also the unit will normally be operated under a moderate positive pressure to facilitate transfer of foam to the clarifier. The process can be conducted in any size unit from a few liters to hundreds of thousands of liters. The prime parameters for a continuous process are retention time of the waste, proper aeration, flotation of the bio-sludge, collapsing of the foam, settling and recovery of sludge, and recycle of such sludge.

An important advantage is that the production of foam is not a problem since it is an integral part of the process. Also, under certain operating conditions and for certain types of waste the bio-sludge generated can be recovered from the clarifier and totally recycled to the aeration unit with subsequent autolysis, and no sludge has to be wasted from the clarifier. It can all be recycled to the activated sludge unit. Thus expensive process equipment required for disposal of excess sludge wastage from the clarifier can be avoided. This problem is so great in the prior art that the conventional activated sludge methods cannot be applied to strong pulp mill waste.

The biological cells and suspended solids in the recycled sludge are efficiently oxidized in the activated sludge unit much as if the chamber were operating as a "biological furnace." Of course, not all the cells are removed from the system in this autolytic-biofurnace, as new cells and catalysts are also synthesized, thus maintaining the system in equilibrium. In test systems studied continuously, they have been operated for 78 days and more without any sludge wastage. The conditions used in such operation are shown separately in several examples.

The present bio-sludge floatation technique is most effective in treating waste which has an inherent tendency to foam. It is also broadly applicable to non-foaming systems to which foaming or floatation agents may be added to induce or sustain the flotation process. Cells become entrapped in the foam and are carried to the surface where they can be removed. It appears that only certain microbes from the aeration vessel are entrapped in the foam and are carried to the clarifier. A foam-activated sludge system operated in this manner has many distinct advantages for treating certain wastes.

It is found that the foam has a lower content of suspended solids (SS) than does the liquid in the fermentor vessel. The suspended solids content, or suspended solids/liquid ratio, of the foam when collapsed may desireably be not more than half that of the fermentor broth. In the usual practice of this invention it will preferably be ¼ to ⅓, most preferably about ⅓. For example, it has been found that the foam, if "broken" or collapsed into a liquid, contains in one case about 13,000 parts per million suspended solid, compared with the 30 to 50,000 parts per million suspended solids content of the liquid in the fermentor from which the foam was formed. In addition to permitting transfer of liquid from the fermentor vessel with a minimized amount of solids transfer, it has been found that when the foam is broken the suspended solids tend to settle very quickly in the clarifier, thus permitting a relatively high rate of removal of liquid from the fermentor and a more rapid recovery of the bio-sludge for recycle. Thus the foaming step reduces the suspended solids to a level and type that will settle far more rapidly than the suspended solids present in the fermentor medium, which would be the form encountered in a conventional transfer process. In the prior art, the reactor liquid overflow is presented to the clarifier for settling. Any transfer of liquid will reduce the efficiency of the process and should be minimized. However, we do not exclude the possiblity of some direct transfer of a small amount of liquid fermentor broth. This may be tolerated so long as it does not adversely affect the settling characteristics of the suspended solids in the clarifier.

The invention was found to be particularly effective in treating the product of bisulfite high yield process. The process involves the treatment of wood chips with a solution of sodium bisulfite ($NaHSO_3$), and cooking at a high temperature and pressure. The partly cooked soft chips go through the usual blow pit, washing the pulp refining steps. The liquid discharge has a pH of 3 to 4.5 and it is called "spent sulfite liquor."

This effluent stream contains small amounts of sulfur dioxide, wood resins, resin acids, high and low molecular weight fatty acids, alcohols, aldehydes, ketones and eugenols, along with large amounts of saccharides and lignosulfonates. The two latter components account for the high biochemical oxygen demand (BOD) and chemical oxygen demand (COD) levels in SSL. No simple economical chemical recovery process is available for these materials. However, the presence of large concentrations of carbohydrates and other organic compounds particularly qualify this type of waste for biological treatment either to remove BOD or to produce valuable products. The sugar components are the main contributors to the high BOD.

The spent liquor which constitutes the substrate or feed for this process may be very high in dissolved solids. It normally has approximately 7 to 11 percent dissolved solids concentration. This is higher than that described previously for biological treatment processes. The prior art generally deals with materials in the area of 3 to 5 percent dissolved solids and lower.

The $BOD_5$ is a conventional term. It is defined as the amount of oxygen required by living organisms engaged in the utilization and stabilization of the organic matter present in the wastewater. The standard test involves seeding with sewage, river water, or effluent, and incubating for 5 days at 20° C. In the practice of the present invention, some adjustment to the concentration of the SSL may be necessary or desirable to compensate for the wide variations encountered in plant samples of the SSL. Reference may be made to the book "Standard Methods For the Examination of Water & Waste Water", 13th edition—1971—American Publich Health Association, Inc.

A continous teatment process has now been developed for the biodegradation of SSL, capable of removing nearly 90 percent of the biochemical oxygen demand ($BOD_5$) of typical high yield sulfite mill effluent. The process may be operated under autolytic conditions with no sludge wastage in which part of the energy generated by the cell also dissolves cells. The process developed can be conducted in any size production vessel; however the autolytic process covered herein was conducted in a pilot scale (48 liter) bioreactor system. Engineering specifications for an industrial process design have been calculated to meet the requirements of the 240 ton per day Abitibi-Iroquois Falls Pulp Mill, to provide maxium $BOD_5$ removal with little or no sludge wastage while operating in the autolytic mode.

However, this SSL treatment process might also be viewed as a potential source of protein; if retention time is reduced to avoid autolysis, wasted sludge which can be a valuable high protein by-product is produced and it can be recovered, dried and utilized in animal feed. The mixed culture system which was developed for this project is a stable, mixed population, long adapted to undiluted SSL medium and apparently not undergoing mutative changes or selective enrichment which could affect its potency. By chemical analysis it is known to resemble yeast grown on carbohydrates, having an amino acid composition typical of high grade feed supplements. It was found to be comparable to other single cell proteins of the yeast type. The continuous reactor studies, therefore, included brief harvesting periods under conditions favourable to excess sludge production, which were found to be compatible with 50–60% $BOD_5$ removal. Thus the two operating modes could be used, (1) with basically no sludge removal and (2) with high sludge production.

In one continuous fermentation experiment 80% reduction of $BOD_5$ was achieved with 2.5 days retention time in the aeration vessel. Suspended solids built up to a maximum of 3.3% (w/v) at the midpoint of the two month run, during which no solids were harvested. Chemical analysis of the sludge detected 40% protein with individual amino acid concentrations suggesting potential nutritional value.

The quality of the SSL after biological treatment has shown significant improvement especially with respect to oxygen demand ($BOD_5$). The microbes removed most of the sugars and other dissolved organic materials with the exception of lignosulfonates. The present process has successfully reduced the total dissolved solids of the incoming SSL, by using these dissolved solids as a substrate for (aerobic) growth in which biomass is generated and carbon dioxide is liberated to the atmosphere. Excess biomass is removed either by autolytic liquefaction and discharge or by harvesting.

SUMMARY OF THE INVENTION

The present invention provides in one aspect, a method for biodegrading a process waste liquor having a propensity to foam comprising aerating and agitating it in a closed fermentation tank, removing foam from the upper part of the fermentor tank, and transferring the foam to a clarifier tank, collapsing the foam in the clarifier tank, collecting the settled sludge, recycling the settled sludge back to the fermentor, and drawing off the treated waste liquor from the clarifier by overflowing it. The process waste liquor may be spent sulfite liquor from a pulp mill.

In another aspect, the present invention provides a method of biodegrading a spent sulfite liquor by an autolytic mixed fungal (yeast and yeast-like) system, comprising the steps of feeding the mixture to a mixed fungal (yeast and yeast-like) inoculated fermentor with agitation and with aeration, resulting in foaming of the mixture, said foam carrying with it fungus and sludge resulting from the fermentation, the suspended solids content of the foam when collapsed being less than the suspended solids content of the fermentor broth, said foam being conducted to a means for separation into a sludge and a clarified effluent, said sludge being recycled to the fermentor vessel.

Nutrient may be added where required. The pH should desirably be mildly acid or neutral. The SSL will normally have a dissolved solids content of 6 to 14%, or preferably 8 to 10%.

The suspended solids content of the foam will normally be not more than half of the fermentor broth.

The suspended solids in the fermentor vessel may desirably be controlled by adjusting the sludge recycling to maintain the suspended solids in the fermentor vessel at not greater than 60,000 parts per million. The degree of recycling and the rate of the feeding of fresh medium will desirably be held at a level at which constant autolysis may be maintained.

Clarification of collapsed foam is effected in the clarifier by underflow of settled sludge and overflow of treated liquor. The fermentation is normally carried out in a closed fermentor, and the aeration air stream provides the means for forcing the foam from the fermentor.

The spent sulfite liquor should contain not more than 1% (W/V) of sulfur dioxide. Some treatment with lime or sodium hydroxide, or boiling or steam stripping may be desirable to achieve this sulfur dioxide level.

The fermentation will normally be carried out at a temperature in the range of 8° to 40° C., preferably 10° to 35° C., and most preferably 30° to 35° C. A typical fermentor broth biomass may have a suspended solids concentration ranging from 10,000 to 60,000 ppm, preferably 35,000. It may employ a fermentor retention time of 1.5 to 4 days and a clarifier retention time of 0.2 to 2 days. Preferably the fermentor retention time is 2.2 days and the clarifier retention time is 1 day.

The pH in the fermentor is normally maintained between 2 to 8.5, preferably around 3.3.

The dissolved oxygen level in the fermentor is normally not less than 0.3 ppm and preferably between 1.5 to 5 ppm.

In some cases, $NH_3$ was added to the fermentor broth in a range of 400 to 4,000 ppm and total phosphate added in a range of 400 to 4,000 ppm and with sufficient caustic to maintain an acceptable pH. In a specific case, the $NH_3$ concentration was 1,330 ppm and phosphate was 1,140 ppm. Preferably the general $BOD_5$:N:P ratio is 100:5:1.

As to the foam after collapse, the suspended solids concentration is preferably in the range of 1000 to 30,000 ppm, normally around 12,000 or 13,000 ppm.

In one aspect, the invention provides an apparatus for biodegrading a process waste liquor having a propensity to foam comprising a closed fermentation tank equipped with an agitator, an aerator, an inlet for liquor feed, an inlet for recycled sludge feed, an outlet for removal of foam from the upper part of the fermentor tank, a means for transferring the foam to a clarifier tank, and said clarifier tank being equipped with foam collapsing means, collecting means for settled sludge, means for recycling the biosludge to maintain the suspended solids in the fermentor at the desired level required for operating in the autolytic mode.

In another aspect, this invention provides a method for biodegrading a process waste liquor comprising the steps of exposing the mixed fungal culture system to increasing concentrations of waste liquor until the system becomes acclimatized to waste liquor of a suitable concentration, then treating process waste liquor with the acclimatized fungal culture system, aerating and agitating the mixture in a closed fermentation tank, supplying the fermented mixture to a clarifier tank, collecting settled sludge and recycling all or part thereof to the fermentation tank, and drawing off the treated waste liquor from the clarifier.

The drawing forming a part of this specification shows schematically a method and apparatus adapted to some aspects of the present invention. The drawing shows a feeding tank into which are supplied spent sulfite liquor (SSL), nutrients, and any pH control material required. The SSL will normally contain about 100–500 parts per million (ppm) suspended solids, after gross filtration, mostly in the form of pulp fiber debris. It will frequently also contain about 70,000 to 111,000 ppm of dissolved solids correspondfing to 18,000 to 34,000 ppm, (sometimes 28,000 to 33,000), of biochemical oxygen demand (BOD).

An advantage of this invention is that the SSL may be treated either without dilution or with minor dilution as compared with normal treatment processes which involve dilution of the order of 10:1 and consequent process difficulties and apparatus capacity requirements due to the handling of a large volume of liquid.

A preferred procedure involves diluting the SSL to about 24,000 or 25,000 ppm BOD before treating it, as a condition for efficient BOD removal and autolytic operation. That mixture from the feeding tank is pumped to a "fermentor" or digester tank supplied with an air inlet, typically providing air under pressure to the lower part of the tank at a rate of about 0.6 vvm (vvm is volume of air/volume of liquid/minute). Agitation means are provided, such as the propeller shown in the drawing. In a steady state the liquid will contain about 36,000 ppm suspended solids, some of the dissolved solids having been converted to suspended solids. It may have a BOD of 5,000 at the steady state, and the non-biodegradable dissolved solids will still remain at about 66,000. There is a means for collecting the foam resulting from the aeration and agitation and transferring it to the clarifier tank at a point above the liquid level in that tank. The tank in this drawing contains a partition extending below the level of the liquid to retain the foam in one part of the clarifier tank. A slit in the partition permits pressure equalization with the other part of the clarifier tank head. The foam can be broken more quickly by the use of standard techniques known in the art, if necessary. In that other part the treated SSL is drawn off by overflow, and transported out of the system as effluent.

The foam transferred from the fermentor to the clarifier exhibits a suspended solids content much lower than the material in the fermentor, typically around 12,000 ppm. The sludge from the clarifier is pumped through the sludge recycle mechanism back to the fermentor or aeration tank. This sludge typically contains around 36,000 to 45,000 ppm suspended solids. The system appears to provide a relatively quick settling sludge, for sludge densities of this type, which is recycled in accordance with good activated sludge practice, thus assisting in maintaining the autolytic activated sludge system. The effluent overflowing in the clarifier is brown in colour due to the presence of lignaceous materials. It has a BOD of around 4,800 ppm. It can be seen that there has been a considerable reduction in the BOD and dissolved solids, with a net decrease in the volume of the liquid. This is due to the evaporative effect of the off-gas stream. There is typically no production of sludge requiring disposal although there is always a small amount of suspended solids in the effluent from the clarifier.

TREATMENT OF SSL

The characteristics of typical SSL from the pulp mill digesters may be known from the following range of compositions found among filtered samples received from the Iroquois Falls Ontario plant over a period of three years.

| | |
|---|---|
| pH: | 2.9–4.5 |
| $BOD_5$: | 20,800–33,900 ppm |
| COD: | 80,900–115,200 ppm |
| Dissolved Solids: | 71,500–111,700 ppm |
| Non-Settleable Suspended Solids: | 0–200 ppm |
| Portion of total $BOD_5$ associated with non-settleable suspended solids: | up to 300 ppm |

Spent sulfite liquor contains sufficient amounts of carbonaceous substrates and essential minerals for a prosperous biological system, but may be found to have insufficient amounts of nitrogen and phosphate under some conditions. As an example, the SSL used in many of these experiments has a chemical analysis as shown.

TABLE 1

| Mineral | Concentration (ppm) |
|---|---|
| $Ca^{++}$ | 190 |
| $K^+$ | 125 |
| $Mg^{++}$ | 28 |
| $Al^{+++}$ | 7 |
| $Fe^{++}, Fe^{+++}$ | 7 |
| N(Kjeldahl) | 6 |
| $PO_4^=$ | 6 |

We have found by tests conducted on SSL taken directly from the digesters of six different pulp mills, that the operative range of residual sulfur dioxide concentration was in the range of 0.24 to 0.78% weight/volume.

In the case of one sample of SSL it was found that enrichment with various nitrogen and phosphorus compounds improved the rate of COD (chemical oxygen demand) reduction.

TABLE 2

Patch studies with 100 ml SSL in 500 ml shake flasks
$BOD_5:N:P = 75:5:1$

| Chemicals tested | COD reduction (%) after 7 days of incubation |
|---|---|
| $NH_4H_2PO_4$ | 16.3 |
| $Ca(NO_3)_2$ | 15.1 |
| $K_2HPO_4$ | |
| $H_3PO_4$ | 14.5 |
| $NH_4OH$ | |
| Control (no chemicals added) | 10.2 |

TABLE 3

$BOD_5$ AND COD REDUCTION RANGES
Continuous reactor study in 8 liter reactor
$BOD:N:P = 100:5:1$

| Chemicals | $BOD_5$, % Reduction | COD, % Reduction |
|---|---|---|
| $K_2HPO_4$ + $KH_2PO_4$ + $NH_4OH$ | 60–84 | 15–28 |

The ratio of phosphates used:
$$\frac{K_2HPO_4}{KH_2PO_4} = \frac{2 \text{ moles}}{1 \text{ mole}}$$

Table 4 shows a comparison between the results obtainable in the present process, as compared with prior art processes. In this table the following terms are used:

| | | |
|---|---|---|
| lb BOD/1000 cu ft | = | lb BOD applied per day, per 1000 cu ft of liquid volume in the aeration tank |
| lb BOD/lb mass | = | lb BOD applied per day, per lb SS in the aeration tank |
| Aeration Period | = | Retention time of the raw waste water flow in the aeration tank, expressed in hours |
| Average Return Sludge Rate | = | Activated sludge returned, as a percentage of the raw waste water influent |
| SS | = | suspended solids |

The prior art data in Table 4 is taken from Table 11-4, p. 507, *Water Supply and Pollution Control*, 2nd ed. Int'l Textbook Co., 1971, by Clark, Viessman and Hammer.

TABLE 4

GENERAL LOADING AND OPERATIONAL PARAMETERS FOR ACTIVATED-SLUDGE PROCESSES

| Process | BOD LOADING Feed Fermentor | | Aeration Period, hours | Average Return Sludge Rates, percent | BOD Removal Efficiency, percent |
|---|---|---|---|---|---|
| | lb of BOD 1000 cu ft | lb of BOD lb SS | | | |
| HIGH RATE (complete mixing) | 100 up | 0.5–1.0 | 2.5–3.5 | 100 | 85–90 |
| STEP AERATION | 30–50 | 0.2–0.5 | 5.0–7.0 | 50 | 90–95 |

TABLE 4-continued
GENERAL LOADING AND OPERATIONAL PARAMETERS FOR ACTIVATED-SLUDGE PROCESSES

| Process | BOD LOADING | | Aeration Period, hours | Average Return Sludge Rates, percent | BOD Removal Efficiency, percent |
|---|---|---|---|---|---|
| | Feed Fermentor lb of BOD 1000 cu ft | lb of BOD lb SS | | | |
| CONVENTIONAL (tapered aeration) | 30–40 | 0.2–0.5 | 6.0–7.5 | 30 | 95 |
| CONTACT STABILIZATION | 30–50 | 0.2–0.5 | 6.0–9.0 | 100 | 85–90 |
| EXTENDED AERATION | 10–30 | 0.05–0.2 | 20–30 | 100 | 85–95 |
| FOAM FLOTATION-AUTOLYTIC - (present process data) | 400 | 0.2 | 30–70 | $\geq 30$ | 80–90 |

The present microbial system has been identified by taxonomy studies as being a mixture of five fungi being yeast and yeast-like bodies of these five species. The five species have been isolated from the mixed culture system several times under different conditions, e.g. from lyophilized material, repeatedly transferred stock culture, etc. Isolate No. 5 exhibited autolytic activity (in plate culture) and the capability to ferment and assimilate glucose, galactose, maltose and sucrose in liquid culture. Isolate No. 4 was also autolytic and assimilated sugars. The species were identified as follows:

TABLE 5
Mixed Culture, Microbial Population

| ISOLATE NO. | NAME AND MORPHOLOGICAL FEATURES (Plate Cultures on Agar) |
|---|---|
| 1 | *Phialophora jeanselmei* (Langeron) Emmons ... New colonies black and yeast-like, changing to woolly green mycelial colonies producing spores in clusters at the tips of short stalks and long tapered phialides without collarettes. |
| 2 | *Phialophora richardsiae* (Nannfeldt apud Melin & Nannf.)....Velvety brown mycelial colonies producing single spores on flask shaped phialides with conspicuous collarettes. |
| 3 | *Hyalodendron lignicola* Diddens ... Powdery white mycelial colonies with conidiophores bearing branched chains and clusters of spores. Refractile spore scars |
| 4 | *Trichosporon infestans* (Moses & Vianna) Ciferri & Redaelli ... New colonies white and yeast-like, changing to sparsely branched mycelial colonies with clusters of blastospores produced directly from hyphae at the junction of cells, also arthrospores produced by fragmentation of hyphae. |
| 5 | *Candida tropicalis* (Castellani) Berkhout ... White, paste-like colonies fringed by mycelia. Blastospores produced in whorls directly from unbranched hyphae at cell junctions. (In liquid culture, abundance of budding ovoid cells and pseudomycelial fragments). |

Thus the present invention has provided a microbial culture system acclimatized to undiluted SSL and having five principal components, all fungi, which have been identified through isolation and accepted taxonomical procedures as the following:
1. *Phialophora jeanselmei* (Langeron) Emmons
2. *Phialophora richardsiae* (Nannfeldt apud Melin & Nannf.)
3. *Hyalodendron lignicola* Diddens
4. *Trichosporon infestans* (Moses & Vianna) Ciferri & Redaelli
5. *Candida tropicalis* (Castellani) Berkout Specimens of the identified isolates have been deposited in the following culture collections:

American Type Culture Collection
12301 Parklawn Drive
Rockville, Maryland
U.S.A.          July 1, 1976

1. Accession No. ATCC 20,482
2. Accession No. ATCC 20,483
3. Accession No. ATCC 20,484
4. Accession No. ATCC 20,485
5. Accession No. ATCC 20,486

Culture Collection
The University of Western Ontario
London, Ontario
Canada

1. Accession No. UWO BE22
2. Accession No. UWO BE05
3. Accession No. UWO BE03
4. Accession No. UWO BE32
5. Accession No. UWO BE07

EXAMPLE 1

In the early stages the ability of the mixed culture system to remove BOD was partially inhibited by the sulfur dioxide in the SSL. By continuous exposure of the mixed culture system to increasing concentrations of SSL it was eventually adapted and acclimatized to the typical levels of sulfur dioxide and dissolved solids present in the undiluted waste. Table 6 shows the initial steps involved in adapting the sewage culture to full strength SSL.

TABLE 6
Acclimatization of the Mixed Culture in Shake Flasks

| Steps | Culture Medium | | Incubation Time (weeks) | Resulting Culture |
|---|---|---|---|---|
| 1 | Stock Culture 20% SSL | 10 ml 90 ml | 1 | A |
| 2 | Culture A 40% SSL | 10 ml 90 ml | 1 | B |
| 3 | Culture B 60% SSL | 10 ml 90 ml | 1 | C |
| 4 | Culture C 80% SSL | 10 ml 90 ml | 1 | D |
| 5 | Culture D 100% SSL | 10 ml 90 ml | 1 | Acclimatized Culture |

The microbial system used was obtained from sewage containing the usual broad spectrum of bacteria, protozoa and fungi. It has been acclimatized to media based on spent sulfite liquor from three high-yield sulfite pulp mills. By selective enrichment the mixed culture system has been stabilized and maintained continuously for more than four years. The same five individual cultures have been consistently isolated from repeatedly transferred stock culture and from cultures obtained from freeze-dried and frozen material harvested from the pilot-scale reactor. These five cultures have been positively identified as known fungi; they represent the principal components of the system. Bacteria and protozoa have not been detected in this stable system, and do not appear to have the ability to adapt to the system. They do not contribute to the operation of the present process.

EXAMPLE 2

Foaming capability associated with a high yield sulfite spent liquor is shown in Table 7. These tests were conducted by aerating 200 ml of SSL at 0.188, 0.250 and 3.13 vvm (volume of air per volume of waste liquid, per minute) and measuring the foam generated. This was done by aerating exactly 5 minutes at the designated vvm, then halting the air flow and observing the rate of foam collapse. Time 0 is the moment the air flow is turned of. The foam is measured by intervals until it becomes stable (or up to 30 minutes.) The vvm is calculated by dividing the observed air flow rate (ml/minute), by the liquid volume (200 ml in this experiment). For example, with the pressure regulated to give a flow rate of 3.75 ml air/min., and 200 ml of SSL in the column, vvm=(37.5/200)=0.187. In Table 7 SS means suspended solids.

Table 7 shows that raw SSL and nutrient treated SSL at pH 3.9 and 7.0 respectively produce copious quantities of foam. Fermentation broth of SSL produced less foam at pH 3.0–3.2 but more than adequate quantities to operate the process.

On the basis of tests conducted on raw SSL we infer that the propensity of the fermentor broth to foam would not vary significantly over a pH range of 3 to 9. Also the rate of foam collapse remains approximately constant up to about the neutral point, above which it significantly decreases.

TABLE 7

RATE OF COLLAPSE OF FOAM

| Liquid | Aeration (vvm) | Volume of foam in ml at time shown time in minutes | | | | | | | | | | |
|---|---|---|---|---|---|---|---|---|---|---|---|---|
| | | 0 | 1 | 2 | 3 | 4 | 5 | 6 | 11 | 12 | 20 | 30 |
| "Raw" SSL pH of 3.9 and a SS of 200 ppm | 0.1875 | 85 | 85 | 85 | 85 | 85 | 85 | 85 | 85 | 25 | 25 | 25 |
| | 0.2500 | 125 | 125 | 125 | 125 | 125 | 125 | 125 | 125 | 25 | 25 | 25 |
| | 0.3125 | 220 | 220 | 220 | 220 | 220 | 220 | 220 | 220 | 30 | 30 | 30 |
| SSL with nutrients pH of 7.0 SS of 200 ppm | 0.1875 | 75 | 75 | 75 | 15 | 15 | 15 | 15 | 15 | 12 | 10 | 10 |
| | 0.2500 | 120 | 120 | 120 | 15 | 15 | 15 | 15 | 12 | 10 | 10 | 10 |
| | 0.3125 | 170 | 120 | 15 | 15 | 15 | 15 | 15 | 15 | 12 | 10 | 10 |
| Fermentation broth pH of 3.15 and SS of 33,300 ppm | 0.1875 | 40 | 25 | 7 | 3 | 0 | | | | | | |
| | 0.2500 | 50 | 30 | 10 | 3 | 0 | | | | | | |
| | 0.3125 | 155 | 100 | 40 | 15 | 5 | 2 | 0 | | | | |

EXAMPLE 3

The mixed culture system used in this example represents a culture system which has been partially adapted to SSL and the typical levels of sulfur dioxide in SSL. This culture could grow in the presence of low levels of sulfur dioxide (0.32%) and demonstrated the potential for adapting to higher levels (0.50%). The capability of the mixture culture system to remove COD and adapt to 0.52% $SO_2$ is shown in Table 8. At levels of sulfur dioxide above 0.52% the mixed culture system is slightly inhibited but still operates satisfactorily. Levels of 1.0% sulfur dioxide can be expected to be far more inhibiting. This is an upper limit of levels encountered in the production processes. When the mixture culture was adapted to the higher levels of sulfur dioxide (greater than 0.32%) it showed an improved ability to remove the biodegradable organic components present in such a liquor.

TABLE 8

Tolerance to $SO_2$

Tolerance Limit: Maximum 0.32% $SO_2$ (w/v) based only on stepwise dilution of SSL, and use of the original partially adapted culture.

| SSL | $SO_2$, % (w/v) | COD After 10 Days Incubating % Reduction |
|---|---|---|
| Original SSL | 0.52 | 18 |
| Diluted SSL (60%) | 0.32 | 29 |
| Stripped SSL, boiled 5 hr. | 0.32 | 30 |

EXAMPLE 4

A continuous foam-activated sludge (mixed culture) process was operated in separate experiments in a 14 liter reactor for periods of 5, 6 and 78 days. Only foam-sludge was transferred to the clarifier and all solids were recycled to the activated sludge unit. No sludge wastage was required even when the continuous operation was run for 78 days. The percent removal of BOD and COD are shown in Table 9, with no allowances for increased concentration of effluent arising from aeration evaporation losses.

TABLE 9

$BOD_5$ and COD Removal by Foam-Activated Sludge Process

| Type of Experiment | Original Values of COD, $BOD_5$ | (ppm) | Days Operated | % Reduction |
|---|---|---|---|---|
| Continuous Run No. 1 | $BOD_5$ | 24,000 | 5 | 75 |
| | COD | 100,000 | | 25 |
| Continuous Run No. 2 | $BOD_5$ | 24,500 | 6 | 84 |
| Continuous Run No. 3 | $BOD_5$ | 23,000 | 78 | 79* |

*14 day average

EXAMPLE 5

A continuous foam-activated sludge experiment was conducted for 78 days in which the retention time of biowaste in the main activated sludge chamber was the main process variable evaluated. The experiment was conducted in a 14 liter CHEMAP reactor operated at an 8 liter capacity. The rate of recycle of sludge from the clarifier was maintained at 1.08 liter/day through the entire experiment. The daily percent BOD removal varied from 55 to 84. Absolutely no sludge wastage was required.

Some of the operating characteristics of the process during that period are summarized in Table 10.

EXAMPLE 6

Some wastes do not contain all the nutrients desired for optimum efficiency in operating an efficient biowaste treatment process. Nutrients required by microbes as well defined in the literature. Sources of nitrogen and phosphorus often must be added to the waste to obtain rapid removal of waste organic compounds.

The levels of nutrients employed in this process are shown in Table II.

TABLE 10

Effect of Retention Time on Removal of BOD and Soluble Solids
(based on SSL analysis before (and after) nutrient addition)

| Portion of run* day no. | Duration of test days | SSL feed rate liters/day | Recycle/feed ratio | Retention time** days | $BOD_5$ removal*** % before | after | Soluble**** solids removal % |
| --- | --- | --- | --- | --- | --- | --- | --- |
| 5–9 | 5 | 2.16 | 0.50 | 2.47 | 58 | (61) | 17 |
| 10–18 | 9 | 2.16 | 0.50 | 2.47 | 75 | (77) | 20 |
| 19–29 | 11 | 2.50 | 0.48 | 2.23 | 71 | (73) | 15 |
| 53–66 | 14 | 2.50 | 0.48 | 2.23 | 77 | (79) | 25 |
| 30–52 | 23 | 3.00 | 0.36 | 1.96 | 66 | (69) | 17 |
| 67–72 | 6 | 3.00 | 0.36 | 1.96 | 76 | (78) | 21 |
| 73–78 | 6 | 3.50 | 0.31 | 1.75 | 58 | (61) | 15 |

*batchwise operation prior to day 5
**calculation of retention time in days (t'):

$$t' = \frac{V}{F + F'}$$

where V = volume of liquid in reactor in liters
F = feed rate in liters/day
F' = sludge recycle rate in liters/day
***uncorrected for evaporation effects
****raw spend sulfite liquor to system at 8.9% dissolved solids

TABLE 11

Mode of Operation and Nutrients Requirements

| Type of Study | Incubation (days) | Chemicals Added | Added Weight Ratio $BOD_5$:N:P (gms) | material % Reduction COD | $BOD_5$ |
| --- | --- | --- | --- | --- | --- |
| Batch operation in 500 ml shake flasks containing 100 ml of material | 7 | $NH_4H_2PO_4$ | 75:5:1 | 16.3 | — |
| | 7 | $Ca(NO_3)_2$ | 75:5:1 | 15.1 | — |
| | 7 | $H_3PO_4$ $NH_4OH$ | 75:5:1 | 14.5 | — |
| | 7 | None(control)[a] | | 10.2 | — |
| Batch operation (Chemap)[c] | 4 | $K_2HPO_4$ $KH_2PO_4$ $NH_4OH$ } 2:1 mole ratio | 100:5:1[b] | 15 | 60 |
| | 7 | same | same | — | 84 |
| Continuous operation (Chemap)[c] | 5 | same | same | 25 | 75 |
| | 6 | same | same | — | 84 |
| | 78 (nsw)[d] | same | same | — | 79[e] |
| Continuous operation 48 liter Reactor containing about 42 l. of material (nsw) | 132 (nsw) | same | same | 28 | 84[f] |
| | 21 | same | 100:2.5:0.5 | — | 66[g] |
| | 16 (nsw) | same | 100:5:0.5 | 27 | 70[h] |

[a]Untreated SSL levels: 6 ppm N, 5 ppm $PO_4$
[b]Equivalent to 1.33 g $NH_3$, 0.82 g $K_2HPO_4$, 0.32 g $KH_2PO_4$, along with approximately 2.0 g NaOH per liter of SSL (as needed to adjust to pH 7)
[c]Fourteen liter "Chemap" (trade mark) reactor containing 8 liters of material
[d](nsw) No sludge wastage
[e]14 day average
[f]11 day average
[g]14 day average
[h]7 day average

EXAMPLE 7

The following tables 12–14 show segments of the experiments described below, dealing with the 256 days of operation of the 48 liter reactor.

Summary of the 48 Liter Reactor Studies

(1) Days 1–87: start up and harvesting mode experiments
(2) Days 87–219: (132 days) autolytic operation at unchanged chemical addition levels
(3) Days 219–240: (21 days) autolytic operation with no NaOH, half previous NH₃ level and half previous phosphate level
(4) Days 240–256: (16 days) autolytic operation with no NaOH, NH₃ restored to original level, but half phosphate level maintained

TABLE 12

FEED CHEMICALS REDUCTION AND $BOD_5$ ASSIMILATION TREND

Continuous Reactor Study in 48 Liter Reactor with nutrient chemicals added as $K_2HPO_4$; $KH_2PO_4$; and $NH_4OH$.

| Segment of Period | Weight Ratio BOD:N:P | Steady State $BOD_5$ Reduction Range % |
|---|---|---|
| 2 | 100:5:1 | 80–88 |
| 3 | 100:2.5:0.5 | 61–68 |
| 4 | 100:5:0.5 | 63–78 |

Periods 3 and 4 cover a time during which additional pilot-scale laboratory studies were made, primarily to examine the feasibility of lowering the chemical requirement of the proposed industrial design. When operated continuously in the autolytic mode, the system could reasonably be expected to require minimal amounts of added nutrients (nitrogen and phosphorus) in the feeding medium since these are not wasted in the form of harvested biomass. Also, a considerable saving in chemical cost could be achieved by eliminating the use of alkali and/or strong acid for neutralization of the SSL feeding medium, as the active culture is known to tolerate a fairly wide pH range.

Accordingly, two final reactor run periods 3 and 4 were made using reduced levels of nutrients in the feed, and omitting the neutralization step. In the first experiment levels of added ammonia and mixed phosphates in the feed were dropped to half their previous values. In the second, the lower level of phosphate was maintained but the ammonia level was restored to the previous higher value. There was no adjustment of feed pH in either experiment, but pH measurements were made after the nutrient additions. All other operating parameters were the same as for the previous optimum autolytic mode. Prior to the final experiments, the reactor had been maintained in this optimum mode without harvesting, although a small increse in the SS level was observed.

The results from these experiments indicate that substantial savings in chemical nutrient costs are possible without excessive loss of BOD removal efficiency.

In addition, for design purposes two sets of temperature change data were recorded for the pilot scale reactor system (during the maintenance period between periods 1 and 2) immediately following the temporary suspension of thermostatic controls. The "air in" and "air out" temperatures were measured by means of thermometers. The unjacketed reactor temperature was seen to decrease by only 5° C. over periods of eight and twelve hours respectively. These tests appear to demonstrate the close balance between energy input and output requirements of the system when operated in the autolytic mode.

TABLE 13

| Portion of Run | Added nutrients Weight Ratio BOD:N:P | Day No. | Suspended Solids (SS), ppm Reactor | Suspended Solids (SS), ppm Clarifier Effluent | pH feed | pH Reactor | pH Clarifier Effluent | Dissolved Solids, ppm "Raw" SSL | Dissolved Solids, ppm Prep'd Feed | Dissolved Solids, ppm Reactor | Dissolved Solids, ppm Clarifier Effluent | BOD₅, ppm "Raw" SSL | BOD₅, ppm Prep'd Feed | BOD₅, ppm Reactor | BOD₅, ppm Clarifier Effluent | % BOD₅ REMOVAL CALCULATED (Based on BOD₅ of Feed 24 Hours Previous) Observed | Corrected for Evaporation | OPERATING DATA FOR FERMENTOR SYSTEM |
|---|---|---|---|---|---|---|---|---|---|---|---|---|---|---|---|---|---|---|
| 1 | 100:5:1 | 1 | 30,500 | — | 7.0 | 4.4 | — | 72,100 | 76,900 | 66,300 | — | 21,500 | 22,000 | 7,100 | — | — | — | Calculated BOD₅ Loading, 295 g/day or 0.65 lb/day |
|  | → | 2 | 28,000 | 1,100 | → | 4.4 | 3.6 | → | → | 68,700 | 69,200 | → | → | 6,700 | 6,400 | 71 | — |  |
|  |  | 3 | 29,200 | — | → | 4.8 | — | → | → | 66,000 | — | → | → | 7,000 | — | — | 81 | Calculated BOD₅ Removal, 248 g/day or 0.55 lb/day |
|  | (Maximum chemicals addition; | 4 | 28,500 | 1,500 | → | 5.3 | 4.7 | → | → | 66,900 | 65,600 | → | → | 7,400 | 6,300 | 71 | — |  |
| 2 |  | 5 | 28,400 | — | → | 4.4 | — | 70,600 | 74,400 | 68,400 | — | 23,300 | 23,900 | 7,000 | — | — | 85 |  |
|  |  | 6 | 32,300 | 2,800 | → | 3.7 | 4.4 | → | → | 64,200 | 65,000 | → | → | 5,700 | 5,400 | 77 | — | Recycle/feed ratio, F'/F = 0.432 |
|  | NaOH added to adjust feed pH to 7) | 7 | 32,400 | — | → | 3.5 | — | → | → | 66,000 | — | → | → | 4,300 | — | — | — |  |
|  |  | 8 | 28,400 | 1,600 | → | 3.3 | 3.4 | → | → | 65,400 | 65,100 | → | → | 5,600 | 4,900 | 80 | 86 |  |
|  |  | 9 | 29,200 | — | → | 3.0 | — | → | → | 64,800 | — | → | → | 4,400 | — | — | — | Retention Time = 2.23 days |
|  |  | 10 | 30,100 | — | → | 2.9 | — | → | → | 63,000 | — | → | → | 5,400 | — | — | 88 | Aeration = 0.60 v.v.m. |
|  | → | 11 | 30,200 | 1,200 | → | 2.9 | 3.0 | → | → | 66,200 | 67,300 | → | → | 5,200 | 4,300 | 82 | — |  |
|  | Averages: |  |  |  |  |  |  |  |  |  |  |  |  |  |  |  |  |  |
|  | 100:2.5:0.5 | 1 | 29,700 | 1,600 | 7.0 | 3.9 | 3.8 | 71,400 | 75,600 | 66,000 | 66,400 | 22,400 | 23,000 | 6,000 | 5,500 | 76 | 84 |  |
|  |  | 2 | 46,500 | 2,500 | 5.8 | 2.4 | 2.4 | → | → | 11,000 | — | 23,300 | 24,100 | 11,000 | 10,400 | 57 | 68 |  |
|  | → | 3 | 45,300 | 1,900 | → | 2.3 | 2.4 | → | → | — | — | → | → | 11,800 | 11,000 | 54 | 67 | Same as above, |
|  | (minimum chemicals addition) | 4 | 45,700 | 1,500 | 6.0 | 2.2 | 2.4 | → | → | — | — | 25,100 | 26,600 | 11,000 | 11,500 | 52 | 65 | except |
|  |  | 5 | 44,400 | 1,300 | → | 2.2 | 2.3 | (NO DISSOLVED SOLIDS DATA) |  |  |  | → | → | 11,600 | 11,900 | 55 | 67 |  |
|  |  | 6 | 44,700 | 1,700 | 6.0 | 2.2 | 2.3 |  |  |  |  | 24,600 | 24,000 | 12,300 | 11,900 | 55 | 67 |  |
| 3 |  | 7 | 44,400 | 1,300 | → | 2.2 | 2.3 |  |  |  |  | → | → | 12,600 | 11,800 | 56 | 68 |  |
|  | (no NaOH) | 8 | 45,500 | 1,300 | → | 2.2 | 2.4 |  |  |  |  | → | → | 12,200 | 10,900 | 54 | 67 | Calculated BOD₅ Removal (based on 66% average) = 194 g/day or 0.43 lb/day |
|  |  | 9 | 45,600 | 1,000 | → | 2.3 | 2.4 |  |  |  |  | → | → | 11,600 | 10,500 | 55 | 68 |  |
|  | →  | 10 | 45,200 | — | → | 2.2 | — |  |  |  |  | → | → | — | — | — | 66 |  |
|  |  | 11 | 45,200 | 1,100 | → | 2.2 | 2.4 |  |  |  |  | 23,300 | 24,100 | 11,200 | 11,200 | 53 | 63 |  |
|  |  | 12 | 44,800 | 1,000 | 6.0 | 2.4 | 2.3 |  |  |  |  | → | → | 12,300 | 12,200 | 49 | 61 |  |
|  |  | 13 | 45,500 | 1,200 | → | 2.3 | 2.4 |  |  |  |  | → | → | 13,500 | 12,700 | 47 | 64 |  |
|  |  | 14 | 41,000 | 1,200 | → | 2.4 | 2.4 |  |  |  |  | → | → | 12,800 | 11,800 | 51 | 64 |  |
|  | → | 15 | 41,700 | 700 | → | 2.3 | 2.2 |  |  |  |  | → | → | 12,200 | 11,800 | 51 | — |  |
|  | Averages: |  |  |  |  |  |  |  |  |  |  |  |  |  |  |  |  |  |
| 4 | 100:5:0.5 | 1 | 44,700 | 1,400 | 6.0 | 2.3 | 2.4 | (NO DISSOLVED SOLIDS DATA) |  |  |  | 24,100 | 24,700 | 12,000 | 11,500 | 53 | 66 |  |
|  |  | 2 | 44,600 | 1,600 | 6.8 | 2.2 | 2.3 |  |  |  |  | → | 23,200 | 11,900 | 12,600 | 46 | 52 |  |
|  | → | 3 | 44,500 | 2,200 | → | 2.4 | 2.4 |  |  |  |  | → | → | 11,400 | 12,600 | 46 | 52 |  |
|  | (lowered phosphates, no NaOH) | 4 | 44,000 | 1,600 | 7.6 | 2.6 | 2.6 |  |  |  |  | → | 23,000 | 10,400 | 12,200 | 47 | 53 | Same as above, |
|  |  | 5 | 43,400 | 1,600 | → | 3.0 | 3.0 |  |  |  |  | → | → | 10,200 | 10,400 | 55 | 59 | except |
|  |  | 6 | 41,500 | 1,100 | 7.3 | 3.3 | 3.2 |  |  |  |  | → | 24,400 | 9,800 | 10,400 | 55 | 59 |  |
|  | → | 7 | — | — | — | — | — |  |  |  |  | 24,100 | → | 10,100 | 10,100 | 59 | 63 | Calculated BOD₅ Removal (based on 70% Average) = 206 g/day or 0.45 lb/day |
|  |  | 8 | 41,900 | 1,000 | → | 4.8 | 4.6 |  |  |  |  | → | → | 8,900 | 10,000 | 59 | 63 |  |
|  |  | 9 | 42,800 | 1,300 | → | 4.8 | 4.6 |  |  |  |  | → | → | 8,800 | 9,200 | 62 | 66 |  |
|  |  | 10 | 43,300 | 700 | 8.0 | 4.9 | 5.0 |  |  |  |  | 23,000 | 23,500 | 8,300 | 8,400 | 66 | 69 |  |
|  |  | 11, 12 | 43,900 | 4,000 | → | 5.5 | 5.4 |  |  |  |  | → | → | 7,200 | 7,900 | 67 | 70 |  |
|  |  |  | 47,900 | 1,200 | → | 6.1 | 5.7 |  |  |  |  | → | → | 7,400 | 8,500 | 64 | 68 |  |
|  |  | 13 | 49,200 | 3,200 | → | 6.5 | 5.8 |  |  |  |  | → | → | — | — | — | — |  |
|  |  | 14 | 53,900 | 1,100 | → | 6.6 | 6.0 |  |  |  |  | → | → | 6,200 | 6,400 | 73 | 76 | Av. 70 |
|  | → | 15 | 51,200 | 800 | → | 6.6 | 5.8 |  |  |  |  | → | → | 5,800 | 6,000 | 75 | 78 | Av. 66 |
|  | Averages: |  | 45,500 | 1,600 | 7.4 | 4.6 | 4.3 |  |  |  |  | 23,600 | 23,500 | 9,000 | 9,600 | 60 | 64 |  |

TABLE 14
SUMMARY OF AVERAGES OF DATA FROM BEST PERIODS, THREE LEVELS OF NUTRIENT CHEMICALS IN 48 LITER FERMENTOR SYSTEM

| PERIOD | | 2 | 3 | 4 |
|---|---|---|---|---|
| Weight Ratio, | $BOD_5$:N:P | 100:5:1 | 100:2.5:0.5 | 100:5:0.5 |
| Av. SS, ppm | Reactor Broth | 29,700 | 44,700 | 45,500 |
| | Clarifier Effluent | 1,600 | 1,400 | 1,600 |
| Av. pH | Feed | 7.0 | 6.0 | 7.4 |
| | Reactor Broth | 3.9 | 2.3 | 4.6 |
| | Clarifier Effluent | 3.8 | 2.4 | 4.3 |
| Av. Dissolved | "Raw" SSL | 71,400 | — | — |
| Solids ppm | Prepared Feed | 75,600 | — | — |
| | Reactor Broth | 66,000 | — | — |
| | Clarifier Effluent | 66,400 | — | — |
| Av. $BOD_5$, ppm | "Raw" SSL | 22,400 | 24,100 | 23,600 |
| | Prepared Feed | 23,000 | 24,700 | 23,500 |
| | Reactor Broth | 6,000 | 12,000 | 9,000 |
| | Clarifier Effluent | 5,500 | 11,500 | 9,600 |
| Av. % $BOD_5$ Removal, Calc'd | | | | |
| A. Uncorrected | | 76 | 53 | 60 (66*) |
| B. Corrected for Evap'n | | 84 | 66 | 64 (70*) |
| Av. Daily $BOD_5$ Loading, Calc'd | | 295 g | 295 g | 295 g |
| Av. Daily $BOD_5$ Loading, Calc'd | | 0.65 lb | 0.65 lb | 0.65 lb |
| Av. Daily $BOD_5$ Removed, Calc'd | | 248 g | 194 g | 206 g* |
| Av. Daily $BOD_5$ Removed, Calc'd | | 0.55 | 0.43 lb | 0.45 lb* |

All Periods, Recycle/Feed ratio = F'/F = 0.432
Reactor Retention time = 2.23 days
Aeration: = 0.60 vvm
*Average $BOD_5$ removal for final eight days.

EXAMPLE 8

Large Scale Continuous Fermentation

A scaled up, preliminary process design is based on the estimated output os undiluted SSL at the Iroquois Falls pulp mill, 310,000 IG/day, as shown in Table 15. These values were calculated for maximum nutrient levels, period 2 of Example 7.

TABLE 15
PROCESS DESIGN SUMMARY

| | |
|---|---|
| SSL Flow Rate | 310,000 IG/day |
| COD Loading Rate | 310,000 Lb/day |
| $BOD_5$ Loading Rate | 75,000 Lb/day |
| Dissolved Solids Loading Rate | 280,000 Lb/day |
| $K_2HPO_4$ Requirement | 1.28 Tons/day |
| $KH_2PO_4$ Requirement | 0.50 Tons/day |
| $NH_3$ Requirement | 2.06 Tons/day |
| NaOH Requirement | 3.10 Tons/day |
| Volume of Aeration Tank | 192,000 $Ft^3$ |
| Depth of Aeration Tank | 40–50 Ft |
| Head Space of Aeration Tank | 3–6 Ft |
| Oxygen Requirement | |
| (a) Based on ultimate BOD | 92,500 Lb $O_2$/day |
| (b) Based on $BOD_5$ | 62,900 Lb $O_2$/day |
| Aeration Tank Retention Time | 2.23 Days |
| Power Requirement for | |
| Deep Tank Reactor | |
| (a) Mixing Requirement | 69.5 HP |
| (b) Oxygenation Requirement | 1100 HP |
| Cooling Water Requirement | |
| For Deep Tank Reactor | 5,000 Tons Water/day |
| (Based on 10% evaporation loss) | |
| Heating Requirement | |
| For Deep Tank Reactor | $158 \times 10^3$ Lb steam/day |
| (Based on 20% evaporation loss) | (Saturated, 212° F., one atm.) |
| Clarifier Area Requirement | 5,200 $Ft^2$ |
| Clarifier Depth | 12 Ft |
| Clarifier Retention Time | 1 Day (approx.) |

TABLE 15-continued
PROCESS DESIGN SUMMARY

| | |
|---|---|
| Recalculated Chemical Requirements for Period 4 of Example 7. | |
| $K_2HPO_4$ | 0.64 tons/day |
| $KH_2PO_4$ | 0.25 tons/day |
| $NH_3$ | 2.06 tons/day |
| NaOH | none |

EXAMPLE 9

A study was made to determine the difference in settling behavior between the fermentor broth and the collapsed foam from the material in the clarifier. It was found that the collapsed foam settled much more rapidly. Table 16 shows the rapid settling of the collapsed foam material compared to undiluted fermentor broth. Even when diluted to the same suspended solids concentration the fermentor broth settled more slowly.

Corresponding 1000 ml samples of collapsed foam and liquid reactor broth were collected during continuous operation of the pilot-scale apparatus in the optimum mode for BOD removal, as set out in Example 7.

Suspended solids levels (SS) were determined in both samples. Settling rate studies for both samples at full strength were made by recording the levels of settled sludge in 1000 ml graduated cylinders at 15 minute intervals for periods up to 150 minutes. Parallel studies were made substituting:

(a) a 1:1 dilution of the collapsed foam
(b) a calculated dilution of the reactor broth having the same SS as the full strength collapsed foam, and
(c) a calculated dilution of the reactor broth having the same SS as the 1:1 collapsed foam (a).

Sludge in the collapsed foam settled much more rapidly than that in the reactor broth. Improved reactor broth settling was obtained by diluting it approximately 3x to the same SS as the collapsed foam. When diluted to Ss of about 8000 ppm the settling rates were more nearly in agreement but the solids in collapsed foam still settled much more rapidly.

TABLE 16
SLUDGE SETTLING RATES IN COLLAPSED FOAM AND REACTOR BROTH

| SAMPLE DESCRIPTION | SUSPENDED SOLIDS ppm | SETTLED SLUDGE VOLUME ml (30 min.) | CLARIFIED ZONE ml (30 min.) | SLUDGE SETTLING RATE calculated* |
|---|---|---|---|---|
| Collapsed Foam, full strength | 16,600 | 970 | 30 | 120 |
| Collapsed Foam, 1:1 dilution | 8,300 | 900 | 100 | 290 |
| Reactor Broth, full strength | 48,400 | 1,000 | 0 | <2 |
| Reactor Broth, diluted | 16,600 | 990 | 10 | 15 |
| Reactor Broth, diluted | 8,300 | 945 | 55 | 190 |

*ml decrease in sludge/hour: calculated from slope of curve from data plotted as sludge volume vs. time elapsed.

COMPARISON WITH OTHER ACTIVATED SLUDGE PROCESSES

Operational characteristics of the autolytic mode which produced maximum BOD removal were calculated in accordance with Metcalf & Eddy, Inc., *Wastewater Engineering: Collection, Treatment, Disposal,*

McGraw-Hill, N.Y., pp. 393–403; and pp. 497–498 (1972) and compared with those of other modifications of the activated sludge process. Several of these known processes claim 85% BOD removal efficiency also, but are restricted to handling much less concentrated waste. The mean cell residence time, $\theta_c$, is defined by $$\theta_c = \frac{X_m}{(\Delta X/\Delta t)_m}$$

where $X_m$ is the total biomass in the system and $(\Delta X/\Delta t_m)$ is the biomass withdrawn daily from the system. This material is wasted as unsettleable solids in the treated effluent. The calculated $\theta_c$ value was 95 days, or from three to twenty times longer than any of the conventional processes including extended aeration (max. 30 days). It is expected that the present process will yield a mean cell residence time higher than 30 days, and in most cases 60 or higher. In a more preferred form it should yield a mean cell residence time of 90 days or higher.

The recycle ratio, $Q_r/Q$ is the ratio of the flow rate of recycled sludge to that of fresh feed. Here the calculated value was 0.43, within the range of 0.25 to 0.50 for the other processes. The food-to-microorganism ratio, U, was 0.23 lb. $BOD_5$/lb MLVSS-day, or generally similar to that for other processes with the exception of modified-aeration (U=1.55.0). The volumetric BOD loading, however, was calculated to be 1,430 lb $BOD_5$/1000 cu. ft. This is ten to one hundred times as high as any of the others possibly excepting the high-rate process (100–1000 lb/cu.ft.). The reactor MLSS was 30,000 mg/liter, generally ten times higher than for conventional treatment processes. Experience has shown that even higher levels, up to 55,000 mg/liter can be tolerated.

The (reactor) hydraulic retention time, V/Q was 2.23 days (54 hours), somewhat longer than average; the maximum cited for the extended aeration process was 36 hours. For the treatment system as a whole, including the clarifier, the hydraulic retention time was calculated to be 3.0 days.

While we have described some forms of our invention, including the best modes known to us for carrying out the invention, the protection afforded to this invention should be limited only by the scope of the appended claims.

We claim:

1. A method of biodegrading a spent sulfite liquor having a dissolved solids content of 6 to 14% by an autolytic mixed fungal (yeast and yeast-like) system, consisting essentially of the steps of
   (a) feeding said liquor to a mixed fungal (yeast and yeast-like) inoculated fermentor with agitation and with aeration, resulting in foaming of the mixture, said foam carrying with its fungus and sludge resulting from the fermentation, the suspended solids content of the foam when collapsed being lower than the suspended solids content of the fermentor broth,
   (b) undertaking material transfer only by conducting said foam to a means for separation into a sludge and a clarified effluent,
   (c) separating said foam into a sludge and a clarified effluent, and
   (d) recycling at least a portion of the separated sludge to step (a).

2. A method as in claim 1 wherein the dissolved solids content of the spent sulfite liquor is 8 to 10%.

3. A method as in claim 1 wherein the suspended solids content of the foam is not more than half that of the fermentor broth.

4. A method as in claim 1 wherein the suspended solids content of the foam is about $\frac{1}{3}$ of that of the fermentor broth.

5. A method as in claim 1 wherein the suspended solids content of the foam is $\frac{1}{4}$ to $\frac{1}{3}$ that of the fermentor broth.

6. A method as in claim 1 comprising adding nutrient material for the fungi to the spent sulfite liquor.

7. A method as in claim 6, wherein said nutrient medium includes added material selected from the group consisting of ammonia and phosphates.

8. A method as in claim 1 comprising adjusting the pH of spent sulfite liquor to a mildly acid or neutral pH.

9. A method as in claim 1 wherein the recycling of sludge to the fermentor tank is controlled where necessary to maintain the suspended solids in the fermentor vessel at not greater than 60,000 parts per million.

10. A method as in claim 1 wherein all of the settled sludge is recycled to the fermentor tank.

11. A method as in claim 1 wherein the degree of recycling and the rate of feeding of fresh liquor are held at a level at which constant autolysis may be maintained.

12. A method as in claim 1 in which the extent to which the sludge is recycled and the ratio of sludge which is recycled is maintained at a level at which an optimum condition for autolysis of the fermentation broth is maintained.

13. A method as in claim 1 wherein the clarification of the foam is effected by gravity separation of solids, with underflow of settled sludge and overflow of treated clarified liquor.

14. A method as in claim 1, wherein the pH of said spent sulfite liquor is adjusted with lime or sodium hydroxide.

15. A method as in claim 1, wherein the fermentation is carried out at a temperature range from 8° to 40° C.

16. A method as in claim 1 utilizing a fermentor broth biomass with a suspended solids concentration ranging from 10,000 to 60,000 ppm and employing a fermentor retention time of 1.5 to 4 days and a clarifier retention time of 0.2 to 2 days.

17. A method as in claim 16 wherein the fermentor retention time is 2.2 days and the clarifier retention time is 1 day.

18. A method as in claim 1 in which the suspended solids in the fermentor is maintained between 10,000 and 60,000 ppm.

19. A method as in claim 18 wherein the suspended solids is maintained at 35,000 ppm.

20. A method as in claim 1 in which the pH in the fermentor is maintained between 2 to 8.5.

21. A method as in claim 20 wherein the pH is around 3.3

22. A method as in claim 1 in which the dissolved oxygen level in the fermentor is not less than 0.3 ppm.

23. A method as in claim 22 wherein the dissolved oxygen level is between 1.5 to 5 ppm.

24. A method as in claim 1 in which the temperature of the fermentor is 10 to 35° C.

25. A method as in claim 24 wherein the temperature is between 30 to 35° C.

26. A method as in claim 1, with inorganic nutrient feeding to the fermentor to improve the BOD removal and autolysis, in which $NH_3$ is added over a range of 400 to 4,000 ppm and total phosphate added in a range 400 to 4,000 ppm and with sufficient caustic to maintain an acceptable pH.

27. A method as in claim 26 wherein the $NH_3$ concentration is 1,330 ppm, and phosphate is 1,140 ppm.

28. A method as in claim 26 wherein general $BOD_5$:N:P ratio is 100:5:1.

29. A method as in claim 1 in which all foam constituents are transferred by an air stream from the aeration vessel to the solid/liquids separator.

30. A method as in claim 1 in which the suspended solids concentration of the foam is from 1000 to 30,000 ppm.

31. A method as in claim 30 wherein the suspended solids is 12,000 ppm.

32. A method as in claim 1, wherein the mean cell residence time, $$(\theta_2 = \frac{X_m}{(\Delta X/\Delta t)_m}$$

where $X_m$ is the total biomass in the system and $(\Delta X/\Delta t_m)$ is the biomass withdrawn daily from the system) of the process is greater than 30 days.

33. A method as in claim 32 wherein the mean cell residence time is at least 60 days.

34. A method as in claim 32 wherein the mean cell residence time is at least 90 days.

35. The method of claim 1 wherein said autolytic mixed fungal (yeast or yeast-like) system is a microbial culture system acclimatized to SSL and having at least one of the following fungal components, which have been identified through isolation and accepted taxonomical procedures:
 1. *Phialophora jeanselmei* (Langeron) Emmons (ATCC 20, 482)
 2. *Phialophora richardsiae* (Nannfeldt apud Melin & Nannf.) Conant (ATCC 20,483)
 3. *Hyalodendron lignicola* Diddens (ATCC 20,484)
 4. *Trichosporon infestans* (Moses & Vianna) Ciferri & Redaelli (ATCC 20,485)
 5. *Candida tropicalis* (Castellani) Berkout (ATCC 20, 486).

36. A method as in claim 35 wherein the mean cell residence time, $$(\theta_c = \frac{X_m}{(\Delta X/\Delta t)_m}$$

where $X_m$ is the total biomass in the system and $(\Delta X/\Delta t)_m$ is the biomass withdrawn daily from the system) of the process is greater than 30 days.

37. The method of claim 1 wherein said autolytic mixed fungal (yeast or yeast-like) system is a microbial culture system acclimatized to SSL and having five principal components, all fungi, which have been identified through isolation and accepted taxonomical procedures as the following:
 1. *Phialophora jeanselmei* (Langeron) Emmons (ATCC 20, 482)
 2. *Phialophora richardsiae* (Nannfeldt apud Melin & Nannf.) Conant (ATCC 20,483)
 3. *Hyalodendron lignicola* (Diddens (ATCC 20,484)
 4. *Trichosporon infestans* (Moses & Vianna) Ciferri & Redaelli (ATCC 20,485)
 5. *Candida tropicalis* (Castellani) Berkout (ATCC 20, 486).

38. A method as in claim 37 wherein the mean cell residence time, $$(\theta_c = \frac{X_m}{(\Delta X/\Delta t)_m}$$

where $X_m$ is the total biomass withdrawn daily from the system) is greater than 30 days.

39. A method as in claim 1 wherein the sport sulfite liquor is rich in soluble carbohydrates.

40. A method as in claim 1 wherein substantially all of the settled sludge is recycled back to the fermentor tank.

41. A method for removing BOD and COD from a spent sulfite liquor (SSL), said method comprising
 treating a spent sulfite liquor containing saccharides and lignosulfonates with a mixed culture system operating in an autolytic mode or a protein-producing mode,
 aerating and agitating the mixed culture system-treated spent sulfite liquor in a closed fermentor tank,
 passing the resulting mixture to a clarifier tank to form sludge and a waste liquor,
 collecting sludge settling from the passed mixture,
 recycling at least a portion of the settled sludge back to the fermentor tank, and
 removing the waste liquor, said mixed culture system comprising a microbial culture system acclimatized to SSL and having five principal components, all fungi, which have been identified through isolation and accepted taxonomical procedures as the following:
 1. *Phialophora jeanselmei* (Langeron) Emmons (ATCC 20,482)
 2. *Phialophora richardsiae* (Nannfeldt apud Melin & Nannf.) Conant (ATCC 20,483)
 3. *Hyalodendron lignicola* Diddens (ATCC 20,484)
 4. *Trichosporon infestans* (Moses & Vianna) Ciferri & Redaelli (ATCC 20,485)
 5. *Candida tropicalis* (Castellani) Berkout (ATCC 20,486).

42. A method of removing BOD and COD from a spent sulfite liquor (SSL), said method comprising:
 treating a spent sulfite liquor containing saccharides and lignosulfonates with a microbial culture system,
 aerating and agitating the microbial culture system-treated spent sulfite liquor in a closed fermentor tank,
 passing the resulting mixture to a clarifier tank to form sludge and a waste liquor,
 collecting sludge settling from the passed mixture,
 recycling at least a portion of the settled sludge back to the fermentor tank, and
 removing the waste liquor, said microbial system being acclimatized to SSL and having at least one of the following fungal components, which have been identified through isolation and accepted taxonomical procedures:
 1. *Phialophora jeanselmei* (Langeron) Emmons (ATCC 20,482)

2. *Phialophora richardsiae* (Nannfeldt apud Melin & Nannf.) Conant (ATCC 20,483)
3. *Hyalodendron lignicola* Diddens (ATCC 20,484)
4. *Trichosporon infestans* (Moses & Vianna) Ciferri & Redaelli (ATCC 20,485)
5. *Candida tropicalis* (Castellani) Berkout (ATCC 20,486).

43. A method for removing BOD and COD from a process waste liquor comprising
   treating said process waste liquor with a mixed culture system operating in an autolytic mode or a protein-producing mode, the mixed culture system comprising a microbial culture system acclimatized to SSL and having five principal components, all fungi, which have been identified through isolation and accepted taxonomical procedures as the following:
   1. *Phialophora jeanselmei* (Langeron) Emmons (ATCC 20,482)
   2. *Phialophora richardsiae* (Nannfeldt apud Melin & Nannf.) Conant (ATCC 20,483)
   3. *Hyalodendron lignicola* Diddens (ATCC 20,484)
   4. *Trichorsporon infestans* (Moses & Vianna) Ciferri & Redaelli (ATCC 20,485)
   5. *Candida tropicalis* (Castellani) Berkout (ATCC 20,486).

44. A method for removing BOD and COD from a process waste liquor comprising
   treating said process waste liquor with a microbial culture system, said microbial culture system being acclimatized to SSL and having at least one of the following fungal components, which have been identified through isolation and accepted taxonomical procedures:
   1. *Phialophora jeanselmei* (Langeron) Emmons (ATCC 20,482)
   2. *Phialophora richardsiae* (Nannfeldt apud Melin & Nannf.) Conant (ATCC 20,483)
   3. *Hyalodendron lignicola* Diddens (ATCC 20,484)
   4. *Trichorsporon infestans* (Moses & Vianna) Ciferri & Radaelli (ATCC 20,485)
   5. *Candida tropicalis* (Castellani) Berkout (ATCC 20,486).

* * * * *

UNITED STATES PATENT AND TRADEMARK OFFICE
CERTIFICATE OF CORRECTION

PATENT NO. : 4,211,645                  Page 1 of 3

DATED : 7/8/80

INVENTOR(S) : James E. ZAJIC et al

It is certified that error appears in the above-identified patent and that said Letters Patent is hereby corrected as shown below:

IN THE ABSTRACT

Line 11: delete "liqnicola" and replace with -- lignicola -- .

IN THE SPECIFICATION

Column 1, line 24: delete "suflite" and replace with -- sulfite --.

Column 2, line 60 and line 63: delete "floatation" and replace with -- flotation -- where they appear.

Column 3, line 40: delete "," and line 40: delete "the" and replace with -- and --

Column 4, line 7: delete "Publich" and replace with -- Public --.

Column 4, line 9: delete "teatment" and replace with -- treatment --.

UNITED STATES PATENT AND TRADEMARK OFFICE
CERTIFICATE OF CORRECTION

PATENT NO. : 4,211,645

DATED : 7/8/80

INVENTOR(S) : James E. ZAJIC et al

It is certified that error appears in the above-identified patent and that said Letters Patent is hereby corrected as shown below:

Column 5, line 5: insert space between "the" and "clarifier".

Column 8, line 12: delete "Patch" and replace with -- Batch --.

Column 14, line 6: delete "as well" and replace with -- are well --.

Column 15, line 26: delete "primarly" and replace with -- primarily --.

Column 16, line 18: delete "increse" and replace with -- increase --.

Column 19, line 38: delete "os" and replace with -- of --.

Column 20, line 38: delete "Ss" and replace with -- SS --.

UNITED STATES PATENT AND TRADEMARK OFFICE
CERTIFICATE OF CORRECTION

PATENT NO. : 4,211,645

DATED : 7/8/80

INVENTOR(S) : James E. ZAJIC et al

It is certified that error appears in the above-identified patent and that said Letters Patent is hereby corrected as shown below:

Column 21, line 29: delete "(U=1.55.0) and replace with -- (U=1.5 - 5.0) --.

Column 23, line 23: delete "($\theta_2$" and replace with -- $\theta_c$ --

Column 23, line 52: delete "($\theta_c$" and replace with -- $\theta_c$ --

Column 24, line 9: delete "($\theta_c$" and replace with -- $\theta_c$ --.

Column 24, line 13: delete "sport" and replace with -- spent --.

Signed and Sealed this

Fifth Day of March 1985

[SEAL]

Attest:

DONALD J. QUIGG

Attesting Officer    Acting Commissioner of Patents and Trademarks